(12) United States Patent  (10) Patent No.: US 8,601,442 B2
Shafi  (45) Date of Patent:  Dec. 3, 2013

(54) MARKER CORRELATION OF APPLICATION CONSTRUCTS WITH VISUALIZATIONS

(75) Inventor: Hazim Shafi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1092 days.

(21) Appl. No.: 12/571,075

(22) Filed: Sep. 30, 2009

(65) Prior Publication Data

US 2011/0078661 A1  Mar. 31, 2011

(51) Int. Cl.
*G06F 9/44* (2006.01)

(52) U.S. Cl.
USPC ................................................ 717/125

(58) Field of Classification Search
USPC ........................................... 717/125
See application file for complete search history.

(56) References Cited

U.S. PATENT DOCUMENTS

| | | | |
|---|---|---|---|
| 6,226,787 B1 * | 5/2001 | Serra et al. | 717/125 |
| 2004/0010771 A1 | 1/2004 | Wallace et al. | |
| 2004/0078785 A1 * | 4/2004 | Dutt et al. | 717/136 |
| 2006/0238538 A1 | 10/2006 | Kapler et al. | |
| 2007/0168968 A1 * | 7/2007 | Bates et al. | 717/124 |
| 2007/0245238 A1 | 10/2007 | Fugitt et al. | |
| 2007/0265833 A1 * | 11/2007 | Nakayama | 704/10 |

OTHER PUBLICATIONS

C. Eric Wu & Anthony Bolmarcich, Gantt Chart Visualization for MPI and Apache Multi-Dimensional Trace Files; Published Date: Dec. 17-20, 2002 http://ieeexplore.ieee.org/stamp/stamp.jsp?tp=&arnumber=1183451&isnumber=26545 (8 pages).

Brian P. Bailey, Chris W. Busby, Shamis T. Iqbal, TAPRAV: An Interactive Analysis Tool for Exploring Workload Aligned to Models of Task Execution—Published Date: Jan. 26, 2007, ScienceDirect https://agora.cs.illinois.edu/download/attachments/9644168/p314-bailey.pdf?version=1&modificationDate=1213917173000 (18 pages).

Visualization Tool—Retrieved Date: Sep. 29, 2009 http://www.usenix.org/events/vm04/tech/full_papers/sweeney/sweeney_html/main_10.html (2 pages).

Thomas Brandes et al., Monitoring Cache Behavior on Parallel SMP Architectures and Related Programming Tools—Retrieved Date: Sep. 29, 2009 http://www.lrr.in.tum.de/~gemdt/home/Vita/Publications/04FGCS.pdf (15 Pages).

Chris Weaver et al., Performance Analysis Using Pipeline Visualization—Retrieved Date: Sep. 29, 2009 http://www.tortolaproject.com/papers/weaver01performance.pdf (10 Pages).

(Continued)

*Primary Examiner* — Li B Zhen
*Assistant Examiner* — Bradford Wheaton
(74) *Attorney, Agent, or Firm* — Workman Nydegger

(57) ABSTRACT

The use of marker(s) in the source code of a program under evaluation. A representation of the marker(s) remains in the binary version of the program under evaluation. During execution, upon executing the marker, data is gathered regarding the timeline of the execution of the marker in the context of overall timeline of execution. A visualization of the marker is then displayed that illustrates the execution of the marker in the context of a larger timeframe of execution. Optionally, the marker may be associated with text, or other data, at least some of which being rendered with the visualization. Accordingly, an application developer, or indeed anyone evaluating the program, may place markers within source code and/or evaluate the timeline of execution of those markers.

20 Claims, 4 Drawing Sheets

(56) References Cited

OTHER PUBLICATIONS

Chris Stolte et al., Visualizing Application Behavior on Superscalar Processors—Retrieved Date: Sep. 29, 2009 http://graphics.stanford.edu/papers/rivet_pipeline/old/pipeline-submitted.pdf (10 Pages).

iPhone OS Technology Overview—Retrieved Date: Sep. 29, 2009 http://developer.apple.com/iphone/library/documentation/Miscellaneous/Conceptual/iPhoneOSTechOverview/iPhoneOSTechOverview.pdf (45 Pages).

* cited by examiner ion flow associated with the visualization of the execution of a target program using markers; and

MARKER CORRELATION OF APPLICATION CONSTRUCTS WITH VISUALIZATIONS

BACKGROUND

Computing systems are providing ever more complex and sophisticated functionality. Such functionality is often primarily driven by underlying software, which itself is becoming ever more complex. Application developers have the task of developing such software, and to appropriately "debug" the application to ensure proper functionality.

Application developers have a wide variety of tools at their disposal in order to author software. First, source code allows the application developer to author software using instructions that are more understandable and intuitive to a human than is binary or intermediate code. The source code is ultimately compiled and/or interpreted into binary to allow readability of the code by a computing processor. In addition, various authoring tools allow for various visualizations that allow a developer to have a good understanding of how the application is currently functioning. For instance, some authoring tools allow a programmer to step through the execution of a program, one line of source code at a time, and evaluate the values associated to various parameters and variables. Authors might also insert temporary lines of code with the design for use in debugging.

BRIEF SUMMARY

Embodiments described herein relate to the use of marker(s) in the source code of a program under evaluation. A representation of the marker(s) remains in the binary version of the program under evaluation. During execution, upon executing the marker, data regarding the timeline of the execution of the marker in the context of overall timeline of execution is gathered. A visualization of the marker is then displayed that illustrates the execution of the marker in the context of a larger timeframe of execution. Optionally, the marker may be turned on and off, such that execution of the marker does not result in a visualization of the marker when the marker is turned off. Also optionally, the marker may be associated with text or data, at least some of which being rendered with the visualization. Such data might include, for example, the callstack as it existed when the marker was executed. Such data might be organized as a custom schema that may be defined in full, or in part, by the evaluator. Accordingly, an application developer, or indeed anyone evaluating the program, may place markers within source code and evaluate the timeline of execution of those markers.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, markers are permitted in source code of a program under evaluation. During execution, upon executing the marker, data is gathered regarding the timeline of the execution of the marker in the context of overall timeline of execution. A visualization of the marker is then displayed that illustrates the execution of the marker in the context of a larger timeframe of execution. The marker may be configurable in a variety of manners, to be described in further detail below, and may include text or data that may be displayed with the visualization of the marker. Accordingly, an application developer, or indeed anyone evaluating the program, may place markers within source code and/or evaluate the timeline of execution of those markers.

First, some introductory discussion regarding computing systems will be described with respect to FIG. 1. Then, various embodiments of the use of such markers will be described with respect to FIGS. 2 through 4.

Figure 1:
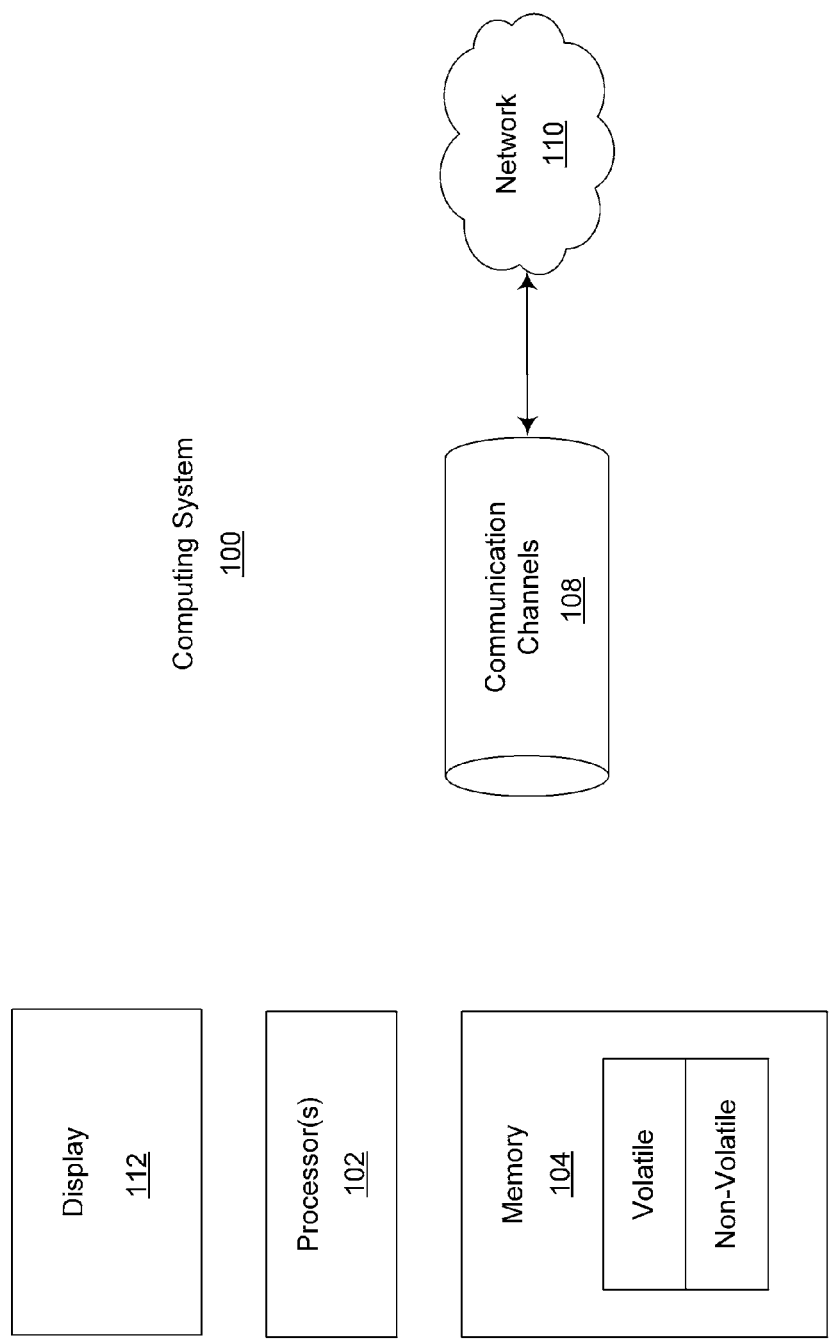
FIG. 1 illustrates an example computing system that may be used to employ embodiments described herein.

First, introductory discussion regarding computing systems is described with respect to FIG. 1. FIG. 1 illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Optionally, the computing system may include a display 112 for displaying visualizations. For instance, if the computing system performs the method 200 of FIG. 2, the visualization of the timeline of the execution of the target program may be rendered at the computing system 100. Having described a computing system that may be used to implement features of the principles described herein with respect to FIG. 1, the use of markers to evaluation a target program will be described with respect to the method 200 of FIG. 2, the flow 300 of FIG. 3, and the user interface example 400 of FIG. 4.

Figure 2:
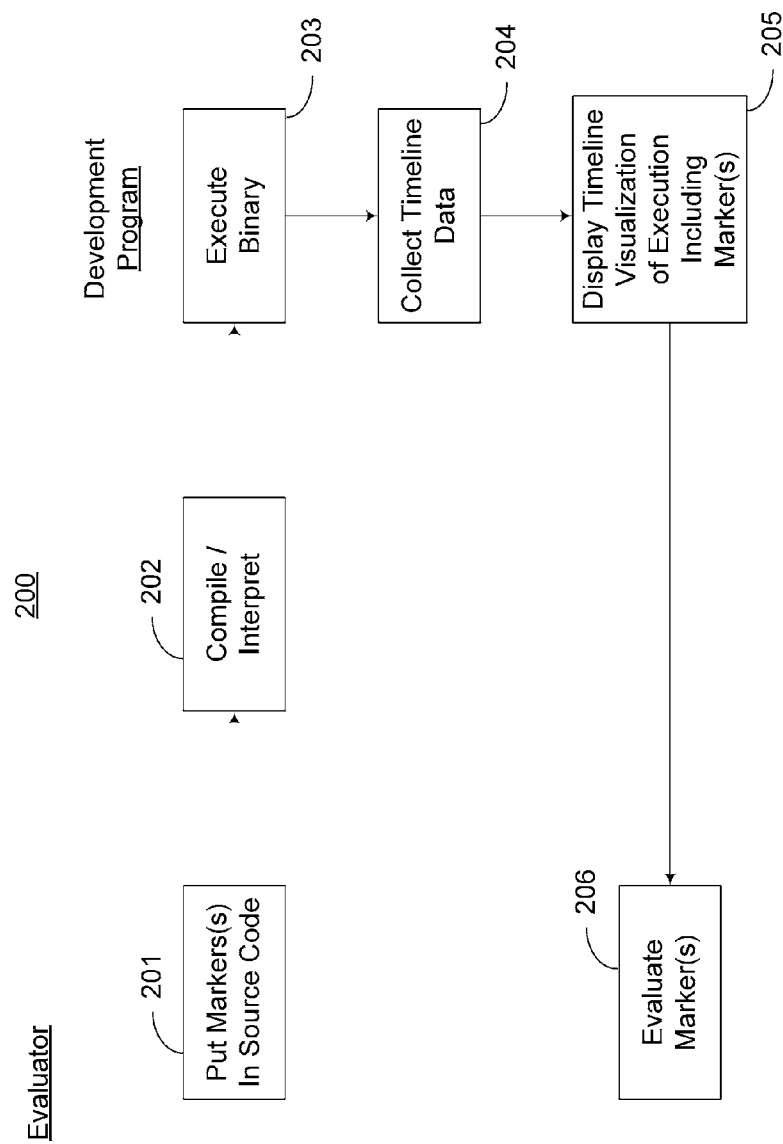
FIG. 2 illustrates a flowchart of a method for visualizing the execution of a target program using markers.

FIG. 2 illustrates a flowchart of a method 200 for using a marker to analyze the execution timeline of a target program. Some of the acts of the method are performed by an evaluator (such as a human evaluator) as included in the left column of FIG. 2 under the heading "Evaluator". Others of the acts of the method 200 are performed by a visualization module as represented in the right column of FIG. 2 under the heading "Development Program". The visualization module may be a visualization tool such as a profiler module. However, since the visualization module might be helpful in the context of a development program, the right column is labeled "Development Program". The process flow 300 of FIG. 3 may also be used to describe the operation of the method 200 of FIG. 2. Accordingly, FIG. 2 will be described with frequent reference to FIG. 3.

Figure 3:
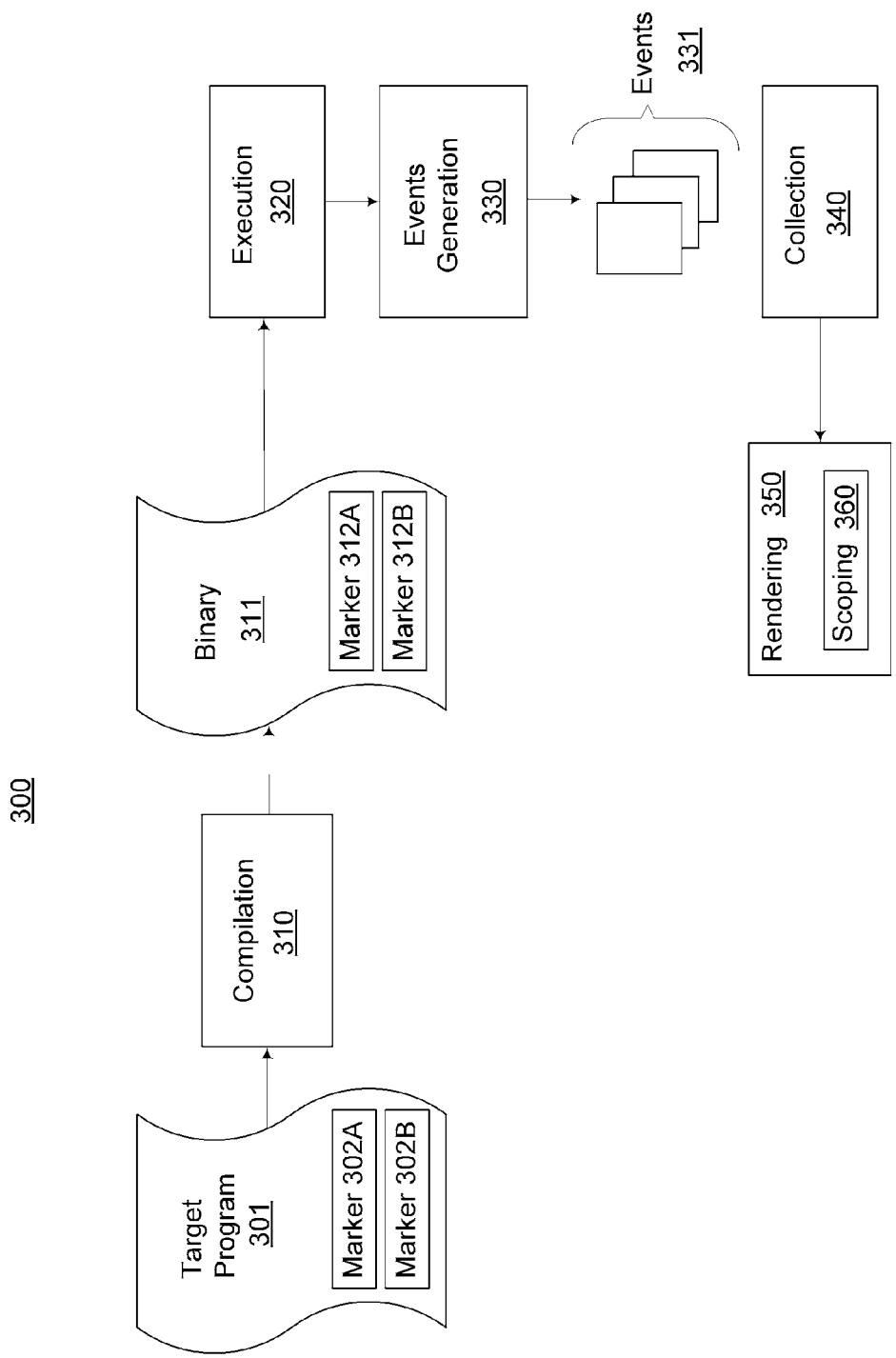
FIG. 3 illustrates a schematic diagram of process flow associated with the visualization of the execution of a target program using markers.

The evaluator may be, for example, a software developer or any kind of human that desires to understand the operation of a particular item of source code. The evaluator places one or more markers in source code (act 201). Referring to FIG. 3, for example, two markers 302A and 302B are inserted in a target program 301 that is represented in source code. The markers are used to later identify when, during a timeline, the markers are executed. The evaluator may place any other number of markers in the target program 301, whether one, several, or many.

The markers may take the form of an application program interface. When the source code is accessed and converted by a compiler and/or interpreter (act 202) prior to or at execution time, the resulting markers (or a representation thereof) may remain represented in the binary version of the target program. In FIG. 3, for example, the binary version 311 of the target program 301 is generated by compiler/interpreter 310 and includes markers 312A and 312B, which correspond to markers 302A and 302B, respectively. The markers 312A and 312B will eventually be visualized on a display. However, in one embodiment, the markers 312A and 312B may be disabled through an appropriate indication in the corresponding source code markers 302A and 302B, or perhaps through the event generation infrastructure. When the marker is executed, an event is generated causing data to be gathered at that time.

Each marker may include a mechanism for display some text or other correlation data along with the visualization of the marker. This correlation text or data allows the evaluator, when viewing the visualization of the marker, to properly identify which marker the visualization correlates to. For instance, the correlation text might indicate "This is where we make the call into the library of executables", or "This is where we expect to access the disk", or so forth. The correlation data might also include some parameter of interest to the evaluator. The correlation data might be organized in a custom schema that is fully or partly defined by the evaluator.

The marker might also include a mechanism for turning the visualization on and off, while keeping the marker in the source code. A "turned off" marker might not be represented in the binary, might not have data gathered as part of the execution even if the marker is in the binary, and/or might be ignored by the rendering engine. In one embodiment, Event Tracing for Windows (ETW) may be used to generate the events. ETW provides a feature that allows events to be turned on and off. A turned off marker will not result in any visualization for that marker, or may at least result in a deemphasized visualization of that marker.

The marker might also have a mechanism for altering options of the marker. For instance, there might be options for the color and form of the visualization of the marker, and so forth. The marker might just reference a single point in the executable code, or it might be associated with another marker so that the visualization emphasizes a range of execution time.

In any case, the development program then executes the binary version of the target program (act 203). For example, referring to FIG. 3, the binary code 311 is subjected to execution 320. In the context of FIG. 1, the processor(s) 102 may execute the binary code.

When the binary is executing, timeline details data is collected (act 204). This data includes sufficient information that at least a rough indication of the execution timeline may be reconstructed based on the data. For instance, the timeline data might include a collection of execution events. For instance, the events might be 1) when an identified thread begins active execution, 2) when an identified thread ends active execution, 3) when an identified disk is written to, 4) when an identified disk is read from, 4) when an identified processor begins processing, 5) when an identified processor is idle, 5) when a particular module is instantiated, 6) when a particular module is released, and so forth. The timeline data might also include the state of the call stack as it existed at the time the marker was executed, thereby allowing the evaluator to see the execution context for the marker. The gathered data may be organized into a schema, which may even be a custom schema that is fully or partly defined by the evaluator. Of course, these are just examples of events from which a timeline of execution may be constructed. The principles described herein are not limited to the particular types of execution events.

One of the execution events, however, is the execution of a marker. When a marker is executed, sufficient information is gathered such that the timing of the execution of the marker within the overall execution timeline can be inferred. For example, at least the relative time of the marker execution is collected. Optionally, in addition, the thread and/or processor that executed the marker may be identified, the marker options may be identified. Of course, if the marker is in the binary, but disabled, then some implementations might choose to not gather data at all. Referring to FIG. 3, as the binary 311 is executed 320, an events generation module 330 generates events 331 which are gathered by collection module 340.

Thus, after execution of the target program is completed or paused, there will be an analysis of the collection of events that includes a timeline that relates to various events that occurred during the execution. The timeline data is then used to display a timeline visualization of the execution of the target program (act 205). For instance, rendering module 350 may access the event collection 340, and interpret the collection of data to construct a visualization of an execution timeline that may be displayed on display 112 of the computing system 100 of FIG. 1. This visualization may include a visualization of the markers themselves. Thus, an evaluator may view the visualization of the marker, with a knowledge of where the marker is in the source code, to thereby determine what is going on in the execution timeline at the time that source code is executed. This can help significantly in assessing the performance of the target program.

In one embodiment, if the collection includes data associated with a marker that might be enabled and disabled, the rendering module 350 may verify whether the marker is enabled before visualizing that associated marker. The scoping module 360 represents that the rendering module 350 might give the evaluator the capability of delving into further details on particular portions of the time (e.g., by zooming in to a subset of the execution timeline), or taking a more expanding view of the execution timeline (e.g., by zooming out on the execution timeline, perhaps to even view all of the execution timeline).

Figure 4:
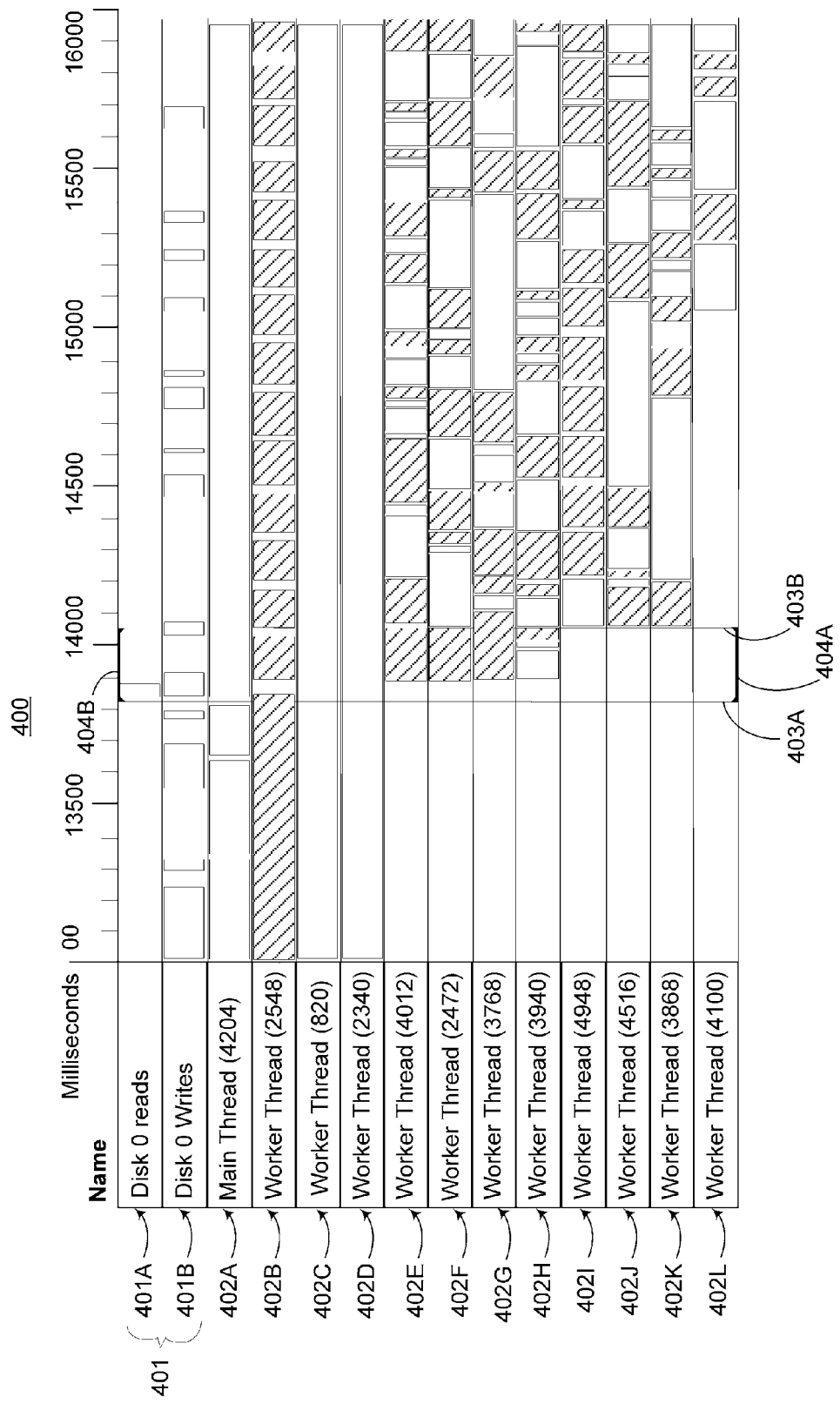
FIG. 4 illustrates a user interface in which an execution timeline is visualized with respect to multiple threads and disk access channels, and using a visualization of a marker.

FIG. 4 illustrate one timeline visualization 400 of an infinite variety of execution timelines that may be visualized using the broader principles of the present invention described herein. In the case of FIG. 4, the timelines are represented in which time is linear in the horizontal direction proceeding from left to right. In this case, each of multiple threads and disk access channels has its own channel or "swimlane" in a particular timeline.

Here, there is a single disk (identified as "Disk 0"), in which there are multiple disk channels 401. In this case, there is a Disk 0 read channel 401A, and a Disk 0 write channel 401B. The channels may be constructed based on events generated when the disk is accessed.

In this case, there are multiple threads that are executing. When a thread begins execution, that thread receives an identifier assigned by the operating system. The creation of such a thread may itself be an event for which data is collected, such as the time of creation, and the thread identifier. In the illustrated cases there is one main thread and 11 worker threads involved in this execution. A timeline is constructed for each by interpreting the timeline data associated with each thread. For example, a main thread channel 402A shows a channel for the main thread identified in this execution as thread 4204. Furthermore, there are 11 worker thread channels 402B through 402L associated with each worker thread. In one embodiment, the visualizations for each thread channel or disk access channel may be turned off, so that the evaluator can obtain a custom view of the timelines of most relevance to the evaluator.

Although not shown in FIG. 4, each channel may be colored at different portions of the timeline, where the color might represent some useful information. For instance, if a thread is actively executing during a particular timeframe, the channel for that thread might be green in that timeframe as symbolized in FIG. 4 using cross-hatching. If a thread is blocked during a particular timeframe, a color might represent a reason why the thread is blocked. Although the specific colors are not illustrated in FIG. 4, empty boxes represent these other colors. As one proceeds through the timeline of a particular thread, an evaluator might encounter several colors, each indicating a particular state. Of course, FIG. 4 is just an example of an infinite variety of timeline visualizations that may be enabled using the principles described herein. Other timeline visualizations might indicate a processor channel that indicates when a particular processor is active, a processor core operation channel that indicates when the core of the processor is active, a kernel channel to indicate when a kernel is active, and so forth.

In this case, the marker visualization marks a range of channels. For instance, a beginning marker executes at time 403A and an ending marker executes at time 403B, with a vertical line representing each point. Range indicators 404A and 404B emphasis the time range between. Although the vertical line extends across all thread and disk access channels, further information regarding the marker may be obtained by having the vertical lines stop at the thread that is executing the marker. In this example, perhaps hovering over the range indicators 404A or 404B might cause any correlation text or data to emerge allowing the evaluator to more easily correlate the visualization of the marker with the actual marker in the source code.

The evaluator may thus manipulate the evaluation of the target program. For instance, the evaluator may zoom in on a period of execution that is most interesting to them. Furthermore, the evaluator can see a picture of the various entities that were executing, understand the order of operation, and so forth. Furthermore, if the evaluator leverages markers as described herein, the evaluator may determine what time was used in particular portions of the program. For instance, by placing a marker before an instruction to access a library, the evaluator may determine when the library was accessed, and how many times.

Accordingly, the principles described herein permit an evaluator to insert markers into source code, and obtain a good visualization of the marker within a timeline of execution of the target program. This might allow an evaluator to understand the execution context of a particular area of source code. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method performed by a computing system having a display for visually indicating on the display a timing of execution of a marker within executable code, the method comprising:

during a time frame, an act of one or more processors of the computing system executing binary code of an application program, the binary code including a binary version of a marker, the binary version of the marker being configured to generate an event for a visualization application programming interface when executed, the binary version of the marker being a compiled version of a source code version of the marker that was added by a user to source code of the application program from which the binary code was compiled, the source code version of the marker identifying one or more of a single point or a range of executable instructions in the application program and including a custom user-specified comment for display in connection with the marker during visualization;

an act of the computing system automatically collecting timeline data regarding the execution of the application program that was acquired during the act of executing during the time frame, including collecting data regarding the execution of the binary version of the marker in the time frame; and an act of displaying on the display a timeline visualization of the execution of the application program, the timeline visualization based on the collected timeline data and including a visualization of one or more threads of the application program along with a visualization of the marker displayed in the context of the timeframe and the one or more threads, the timeline visualization providing access to the custom user-specified comment of the marker.

2. The method in accordance with claim 1, wherein the marker includes a mechanism for turning the visualization of the marker on and off.

3. The method in accordance with claim 1, wherein the marker includes a mechanism for altering options of the visualization of the marker.

4. The method in accordance with claim 1, wherein the marker marks a single point in the application program.

5. The method in accordance with claim 1, wherein the marker marks a range of executable instructions in the application program.

6. The method in accordance with claim 1, wherein the visualization of the marker also includes an association with a thread that executed the marker.

7. The method in accordance with claim 1, wherein the visualization of the marker also includes an association with a callstack.

8. The method in accordance with claim 1, wherein the timeline visualization of the execution of the application program includes a plurality of timeline visualizations, one for at least some of the threads that executed during the execution of the application program during the time frame.

9. The method in accordance with claim 1, wherein the act of automatically collecting timeline data regarding the execution comprises an act of capturing a time that the marker executed.

10. The method in accordance with claim 1, wherein the act of automatically collecting timeline data regarding the execution comprises an act of capturing details for a plurality of execution events, at least one of which, but less than all of which, being related to the execution of the marker.

11. The method in accordance with claim 1, wherein the marker includes a mechanism displaying schematized data along with the visualization of the marker, the schema of the schematized data being at least partly defined by an evaluator of the application program.

12. The method in accordance with claim 1, the marker being a first marker, the source code further comprising a second marker, wherein the binary version of the application program also includes a binary version of the second marker, wherein the collected timeline data further includes data regarding the execution of the second marker in the time frame, and wherein the display also displays a visualization of the second marker displayed in the context of the timeframe.

13. The method in accordance with claim 12, wherein the first marker is a first type of marker, and the second marker is a second type of marker that is different than the first type of marker.

14. A physical computer program product comprising one or more computer-readable storage media, excluding signals, having stored thereon one or more computer-executable instructions that, when executed by one or more processors of a computing system, cause the computing system to implement a method for visually indicating on a display a timing of execution of a marker within executable code, the method comprising:

during a time frame, an act of one or more processors of the computing system executing binary code of an application program, the binary code including a binary version of a marker, the binary version of the marker being configured to generate an event for a visualization application programming interface when executed, the binary version of the marker being a compiled version of a source code version of the marker that was added by a user to source code of the application program from which the binary code was compiled, the source code version of the marker identifying one or more of a single point or a range of executable instructions in the application program and including a custom user-specified comment for display in connection with the marker during visualization;

an act of the computing system automatically collecting timeline data regarding the execution of the application program that was acquired during the act of executing during the time frame, including collecting data regarding the execution of the binary version of the marker in the time frame; and an act of displaying on the display a timeline visualization of the execution of the application program, the timeline visualization based on the collected timeline data and including a visualization of one or more threads of the application program along with a visualization of the marker displayed in the context of the timeframe and the one or more threads, the timeline visualization providing access to the custom user-specified comment of the marker.

15. The physical computer program product in accordance with claim 14, wherein the marker includes a mechanism for turning the visualization of the marker on and off.

16. The physical computer program product in accordance with claim 14, wherein the marker includes a mechanism for altering options of the visualization of the marker.

17. A computer system, comprising:
one or more processors;
system memory; and
one or more computer-readable media having stored thereon one or more computer-executable instructions that are structured on the one or more computer-readable media such that, when executed by the one or more processors of the computing system, the computing system implements a method for visually indicating on a display a timing of execution of a marker within executable code, the method comprising:
during a time frame, an act of one or more processors of the computing system executing binary code of an application program, the binary code including a binary version of a marker, the binary version of the marker being configured to generate an event for a visualization application programming interface when executed, the binary version of the marker being a compiled version of a source code version of the marker that was added by a user to source code of the application program from which the binary code was compiled, the source code version of the marker identifying one or more of a single point or a range of executable instructions in the application program and including a custom user-specified comment for display in connection with the marker during visualization;
an act of the computing system automatically collecting timeline data regarding the execution of the application program that was acquired during the act of executing during the time frame, including collecting data regarding the execution of the binary version of the marker in the time frame; and
an act of displaying on the display a timeline visualization of the execution of the application program, the timeline visualization based on the collected timeline data and including a visualization of one or more threads of the application program along with a visualization of the marker displayed in the context of the timeframe and the one or more threads, the timeline visualization providing access to the custom user-specified comment of the marker.

18. The computer system in accordance with claim 17, wherein the marker includes a mechanism for turning the visualization of the marker on and off.

19. The computer system in accordance with claim 17, wherein the marker includes a mechanism for altering options of the visualization of the marker.

20. The computer system in accordance with claim 17, wherein the visualization of the marker also includes an association with a callstack.

* * * * *